United States Patent
Tanaami et al.

(10) Patent No.: US 12,502,784 B2
(45) Date of Patent: Dec. 23, 2025

(54) MANUFACTURING SYSTEM AND MANUFACTURING METHOD FOR MANUFACTURING ASSEMBLY INCLUDING TAP

(71) Applicant: SINTOKOGIO, LTD., Nagoya (JP)

(72) Inventors: Yoshikane Tanaami, Nagoya (JP); Miyuki Hayashi, Nagoya (JP); Takahiro Kokawaji, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 162 days.

(21) Appl. No.: 18/165,471

(22) Filed: Feb. 7, 2023

(65) Prior Publication Data
US 2023/0278220 A1  Sep. 7, 2023

(30) Foreign Application Priority Data
Mar. 4, 2022 (JP) ................. 2022-033833

(51) Int. Cl.
*B25J 9/16* (2006.01)
*B25J 11/00* (2006.01)
(Continued)

(52) U.S. Cl.
CPC .......... *B25J 9/1687* (2013.01); *B25J 11/005* (2013.01); *B25J 13/082* (2013.01); *B25J 15/0038* (2013.01); *B25J 19/02* (2013.01)

(58) Field of Classification Search
CPC ...... B25J 9/1687; B25J 11/005; B25J 13/082; B25J 15/0038; B25J 19/02; B25J 15/10;
(Continued)

(56) References Cited

U.S. PATENT DOCUMENTS 5,346,337 A * 9/1994 Truesdell .............. B23G 1/18
                                                  279/157
5,531,013 A   7/1996 Nakamura
(Continued)

FOREIGN PATENT DOCUMENTS

CN     107405719 A  * 11/2017  ............ B23B 31/20
JP     S51-097882 A    8/1976
(Continued)

OTHER PUBLICATIONS

CN107405719B.translate (Year: 2017).*
JP2015024487A.translate (Year: 2015).*

*Primary Examiner* — B M M Hannan
(74) *Attorney, Agent, or Firm* — Harness, Dickey & Pierce, P.L.C.

(57) ABSTRACT

An improvement in reliability of manufacture of an assembly including a tap is achieved. A control section of a manufacturing system for manufacturing an assembly including a tap causes a robot to perform: a step of producing a first assembly by gripping a cap having an opening and engaging the cap with a collet having a recess such that the cap is placed on the collet; a step of producing a second assembly by gripping the first assembly and inserting the first assembly into a recess of a tap holder; and a step of producing a third assembly, which is an assembly including a tap, by gripping the tap and inserting the tap through the opening of the cap of the second assembly into the recess of the collet.

6 Claims, 8 Drawing Sheets

(51) Int. Cl.
*B25J 13/08* (2006.01)
*B25J 15/00* (2006.01)
*B25J 19/02* (2006.01)

(58) Field of Classification Search
CPC ........ B25J 13/085; B25J 9/1633; B25J 13/08;
G05B 2219/40032; G05B 2219/40033;
B23P 21/00; B23P 19/04; B25B 11/02;
B23Q 17/2457
USPC .......................................................... 700/258
See application file for complete search history.

(56) References Cited

U.S. PATENT DOCUMENTS

| | | | |
|---|---|---|---|
| 2006/0039770 A1* | 2/2006 | Hughes, Jr. ........ | B23Q 17/2216 409/234 |
| 2006/0051168 A1* | 3/2006 | Hughes, Jr. ............. | B23G 1/20 408/1 R |
| 2006/0051169 A1* | 3/2006 | Hughes, Jr. ........ | B23Q 17/2216 408/1 R |
| 2006/0093447 A1* | 5/2006 | Hughes, Jr. ........ | B23Q 17/2216 408/1 R |
| 2006/0099038 A1* | 5/2006 | Hughes, Jr. ............. | B23G 1/20 408/1 R |
| 2007/0020065 A1* | 1/2007 | Kirby ..................... | B23Q 1/035 414/1 |
| 2008/0292419 A1 | 11/2008 | Hild et al. | |
| 2014/0102239 A1* | 4/2014 | Umeno ................. | B25J 9/0087 294/213 |
| 2014/0106386 A1* | 4/2014 | Umeno ................. | G01N 33/53 435/23 |
| 2020/0180063 A1* | 6/2020 | Wilcox ................... | B23K 11/11 |

FOREIGN PATENT DOCUMENTS

| | | | | |
|---|---|---|---|---|
| JP | H03-120324 | U | | 12/1991 |
| JP | H07-068434 | A | | 3/1995 |
| JP | 2001-179564 | A | | 7/2001 |
| JP | 2015-24487 | A | | 2/2015 |
| JP | 2020-142324 | A | | 9/2020 |
| KR | 20200088875 | A | * | 7/2020 |
| WO | WO-2016157500 | A1 | * | 10/2016 ............. B23B 31/20 |

\* cited by examiner

MANUFACTURING SYSTEM AND MANUFACTURING METHOD FOR MANUFACTURING ASSEMBLY INCLUDING TAP

This Nonprovisional application claims priority under 35 U.S.C. § 119 on Patent Application No. 2022-033833 filed in Japan on Mar. 4, 2022, the entire contents of which are hereby incorporated by reference.

TECHNICAL FIELD

The present invention relates to a manufacturing system and a manufacturing method for manufacturing an assembly which is to be attached to a machine tool and which includes a tap.

BACKGROUND ART

A machine tool is known which performs tapping processing (Patent Literature 1). In many cases, the tapping processing is performed while a change from one tap to another is made for, for example, another tap hole having a different diameter. In this case, an assembly including a tap is commonly used in order to facilitate the change of the taps. That is, an operator produces the assembly including the tap by, for example, attaching the tap to a tap holder, and then attaches the assembly to a machine tool.

However, it cannot be said that it is always easy for the operator to produce the assembly including the tap quickly and without errors. For example, the tap can drop and break while an attempt to attach the tap is being made, and the tap can damage the tap holder while an attempt to combine the tap and the tap holder which have different diameters is being made. A careful operation performed by a skilled operator can reduce such losses, but is not always preferable in view of operation efficiency.

CITATION LIST

Patent Literature

[Patent Literature 1]
Japanese Patent Application Publication Tokukai No. 2015-24487

SUMMARY OF INVENTION

Technical Problem

It is an object of an aspect of the present invention to provide a manufacturing system and a manufacturing method which are for manufacturing an assembly and which achieve an improvement in reliability of manufacture of an assembly including a tap.

Solution to Problem

In order to solve the foregoing problem, the manufacturing system for an assembly including a tap in accordance with an embodiment of the present invention includes a robot and a control section. The robot includes a chuck and an arm. The arm is connected to the chuck, and the arm move the chuck. The control section controls the robot. The control section causes the robot to perform: a step of producing a first assembly; a step of producing a second assembly; and a step of producing a third assembly. In the first assembly, a recess of a collet is disposed in an opening of a cap. In the step of producing the first assembly, the cap having the opening is gripped with use of the chuck and is engaged with the collet having a recess such that the cap covers the collet. The second assembly is such that the collet which is engaged with the cap is inserted into the recess of the tap holder. In the step of producing the second assembly, the first assembly is gripped with use of the chuck and is inserted into the recess of the tap holder. The third assembly is an assembly including a tap. In the step of producing the third assembly, the tap is gripped with use of the chuck and is inserted through the opening of the cap of the second assembly into the recess of the collet.

Advantageous Effects of Invention

An aspect of the present invention makes it possible to provide a manufacturing system and a manufacturing method which are for manufacturing an assembly and which achieve an improvement in reliability of manufacture of an assembly including a tap.

DESCRIPTION OF EMBODIMENTS

Embodiment

Figure 1:
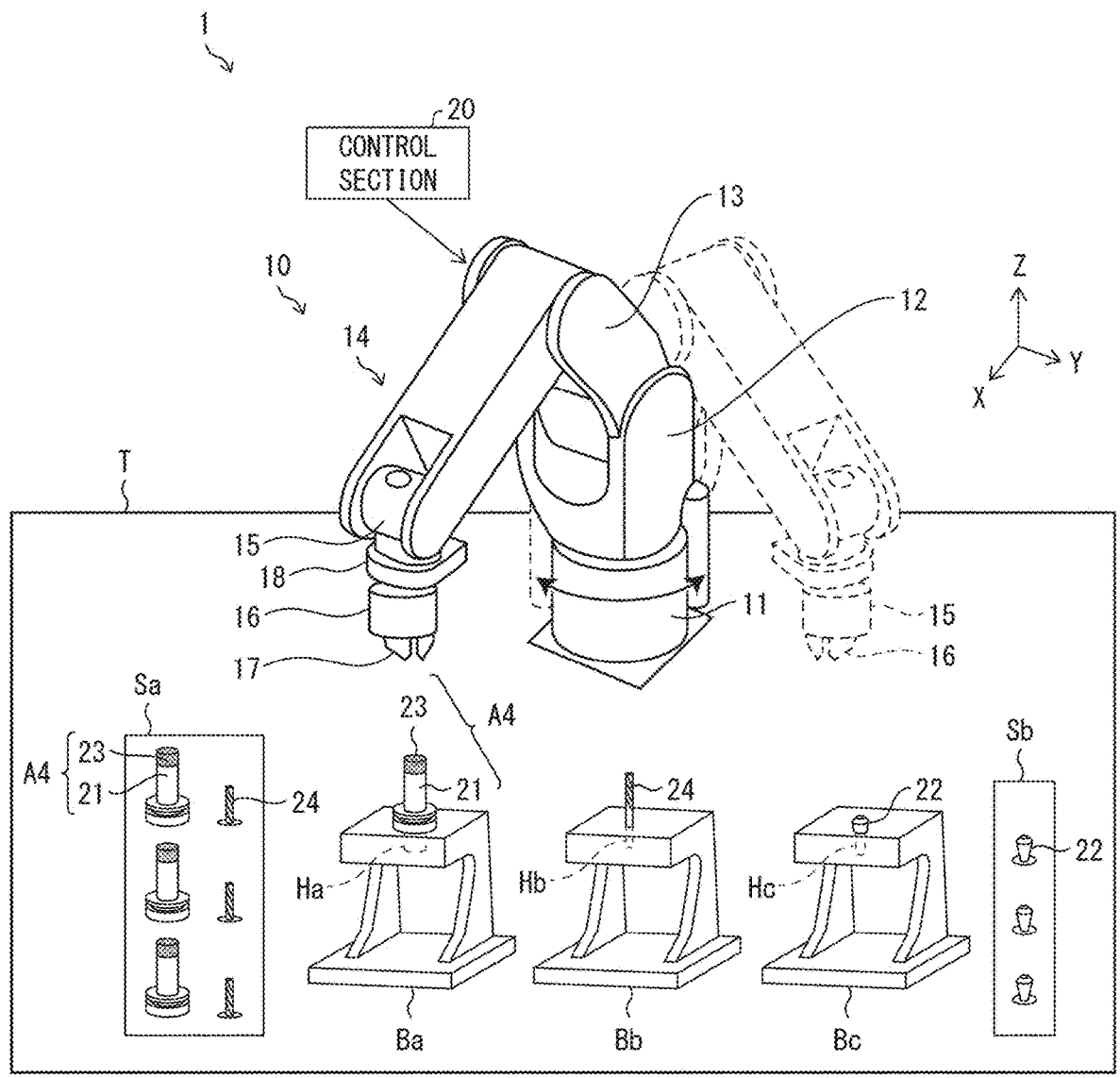
FIG. 1 is a view illustrating the manufacturing system for an assembly including a tap in accordance with an embodiment of the present invention.

The following will describe an embodiment of the present invention in detail. FIG. 1 is a view illustrating a manufacturing system 1 for an assembly including a tap in accordance with an embodiment of the present invention. The manufacturing system 1 for the assembly including a tap includes a robot 10 set on a table T and manufactures the assembly (an assembly A0 described later) including a tap. XYZ coordinates are set such that the X axis and the Y axis are the respective two directions which are parallel to the main surface of the table T and which are orthogonal to each other, and the Z axis is a direction perpendicular to the main surface of the table T.

Figure 2:
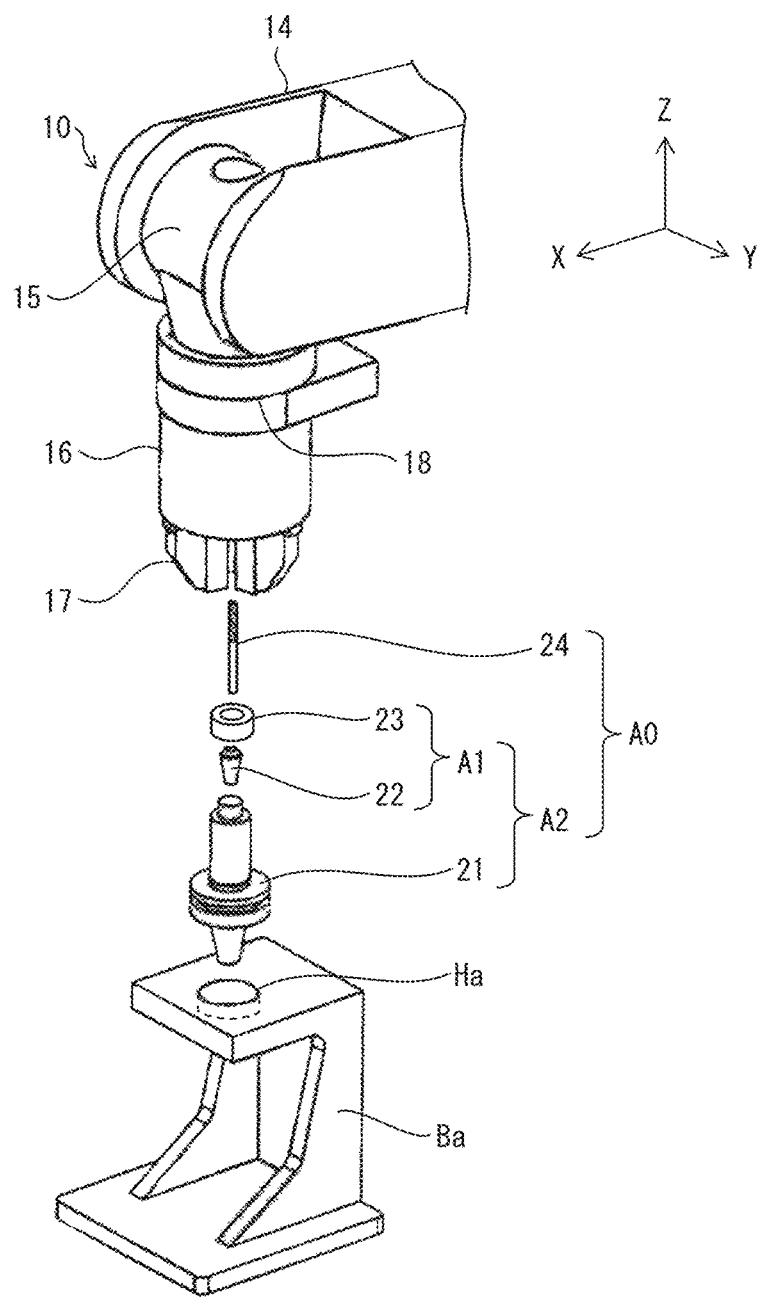
FIG. 2 is an exploded perspective view illustrating the assembly in a disassembled state.

First, the following will describe an assembly (assembly A0) including a tap. FIG. 2 is an exploded perspective view illustrating the assembly A0 in a disassembled state. The assembly A0 is constituted by a tap holder 21, a collet 22, a cap 23, and a tap 24 which are combined with each other. As described later, the robot 10 prepares assemblies A1 and A2 sequentially and finally produces the assembly A0 on a simple setter Ba. The assembly A1 is constituted by the collet 22 and the cap 23. The assembly A2 is constituted by the assembly A1, the collet 22, and the tap holder 21. The assembly A0 is constituted by the assembly A2 and the tap 24.

Figure 3:
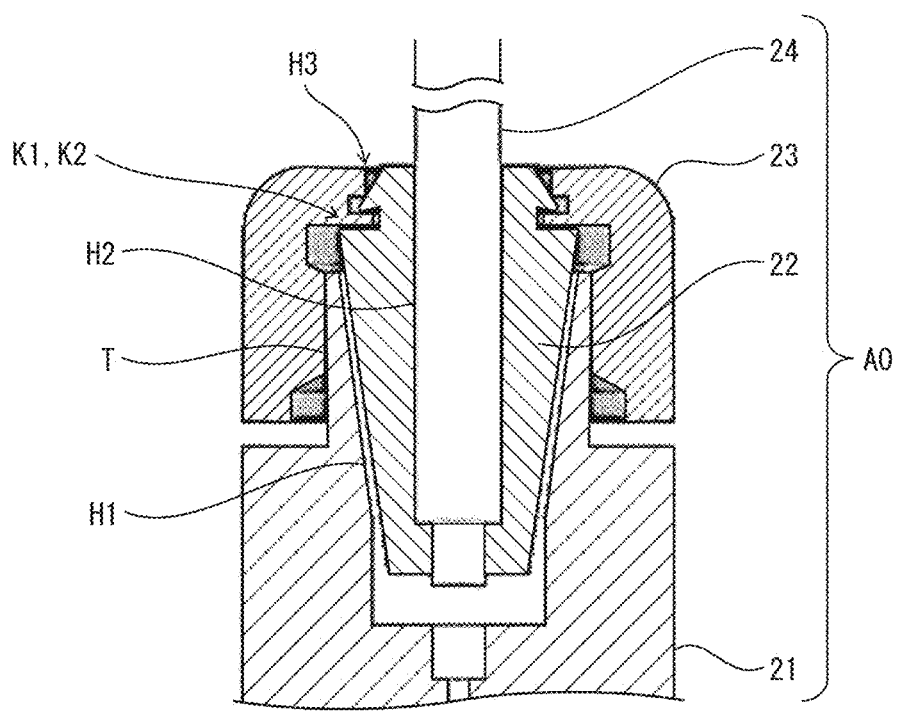
FIG. 3 is a cross-sectional view illustrating a cross section of the assembly.

FIG. 3 is a cross-sectional view illustrating a cross section of the assembly A0. In the assembly A0, the tap holder 21, the collet 22, the cap 23, and the tap 24 are combined with each other. The tap holder 21 has: a protrusion T having a substantially columnar shape; and a recess H1 having a substantially inverted truncated cone shape. The collet 22 has: an outer periphery having a substantially inverted truncated cone shape; and a recess H2 having a substantially columnar shape. The cap 23 has a substantially cylindrical shape and has: an opening H3 having a substantially circular shape; and an internal space having a diameter larger than that of the opening H3. The collet 22 is disposed in the tap holder 21 such that the outer periphery of the collet 22 conforms to the inner periphery of the recess H1 of the tap holder 21. The cap 23 covers the protrusion T of the tap holder 21 and has an engagement part K2 which engages with an engagement part K1 of the collet 22. The tap 24 has a substantially columnar shape and is inserted into the recess H2 of the collet 22.

The following will further describe the embodiment of the present invention with reference to FIG. 1 again. The robot 10 is disposed on the table T and includes a stage 11, arms 12 to 15, a chuck mechanism 16, a chuck 17, a force sensor 18, and a control section 20.

The arms 12 to 15 are orderly connected to the stage 11. The arms 12 to 15 are connected to the chuck mechanism 16 (specifically, the chuck 17) to enable the chuck mechanism 16 (chuck 17) to be moved to a desired position. That is, the arm 12 is connected to the stage 11 so as to be turnable rightward and leftward. The arms 12 and 13 are rotatably connected to each other; the arms 13 and 14 are rotatably connected to each other; and the arms 14 and 15 are rotatably connected to each other. As a result, with the arms 12 to 15, it is possible to adjust, as appropriate, the position of the chuck mechanism 16 (chuck 17) (for example, the distance from the stage 11 to the chuck 17, and the height from the table T to the chuck 17) and a tilt of the chuck mechanism 16 (chuck 17) (for example, an angle which an axial direction of the chuck mechanism 16 forms with the Z axis and an angle which an axial direction of the chuck 17 forms with the Z axis). In addition, the arm 15 can rotate the chuck mechanism 16.

The chuck 17 can grip and release a component as appropriate. The chuck mechanism 16 drives the chuck 17 so as to open and close the chuck 17.

The force sensor 18 detects forces F (Fx, Fy, and Fz) and moments M (Mx, My, and Mz) which are applied to the chuck mechanism 16 (chuck 17) during assembly. The moments Mx, My, and Mz are the moments about the X axis, the Y axis, and the Z axis, respectively, and the forces Fx, Fy, and Fz are the forces in the directions of the X axis, the Y axis, and the Z axis, respectively.

The control section 20 controls the robot 10 (arms 12 to 15 and chuck mechanism 16) and causes the robot 10 to manufacture (assembly) the assembly A0. That is, the robot 10 sequentially performs the steps (1) to (3) below. This makes it possible to reliably manufacture the assembly A0. The steps (1) to (3) are:

(1) the step of producing the assembly A1 (a first assembly) by gripping the cap 23 (having the opening H3) with use of the chuck 17 and engaging the cap 23 with the collet 22 (having the recess H2) such that the cap 23 is placed on the collet 22, the assembly A1 being such that the recess H2 of the collet 22 is disposed in the opening H3;

(2) the step of producing the assembly A2 (a second assembly) by gripping the assembly A1 with use of the chuck 17 and inserting the assembly A1 into the recess H1 of the tap holder 21, the assembly A2 being such that the collet 22 which is engaged with the cap 23 is inserted into the recess H1 of the tap holder 21: and (3) the step of producing the assembly A0 (a third assembly; an assembly including a tap) by gripping the tap 24 with use of the chuck 17 and inserting the tap 24 through the opening H3 of the cap 23 of the assembly A2 into the recess H2 of the collet 22.

On the table T, disposed are an assembly A4 (the tap holder 21 on which the cap 23 is placed) inserted into an attachment hole Ha of a simple setter Ba, the tap 24 inserted into an attachment hole Hb of a tap stand Bb, and the collet 22 inserted into an attachment hole Hc of a collet stand Bc. As described later, the robot 10 manufactures the assembly A0 with use of components (the assembly A4, the tap 24, and the collet 22) held by the simple setter Ba, the tap stand Bb, and the collet stand Bc, respectively.

On the table T, disposed are a component holding part Sa for holding the assembly A4 (the tap holder 21 with the cap 23) and the tap 24, and a component holding part Sb for holding the collet 22. As described later, an operator places the assembly A4, the tap 24, and the collet 22 on the simple setter Ba, the tap stand Bb, and the collet stand Bc respectively, with use of the tap holder 21, tap 24, and collet 22 held by the component holding parts Sa and Sb.

Figure 4:
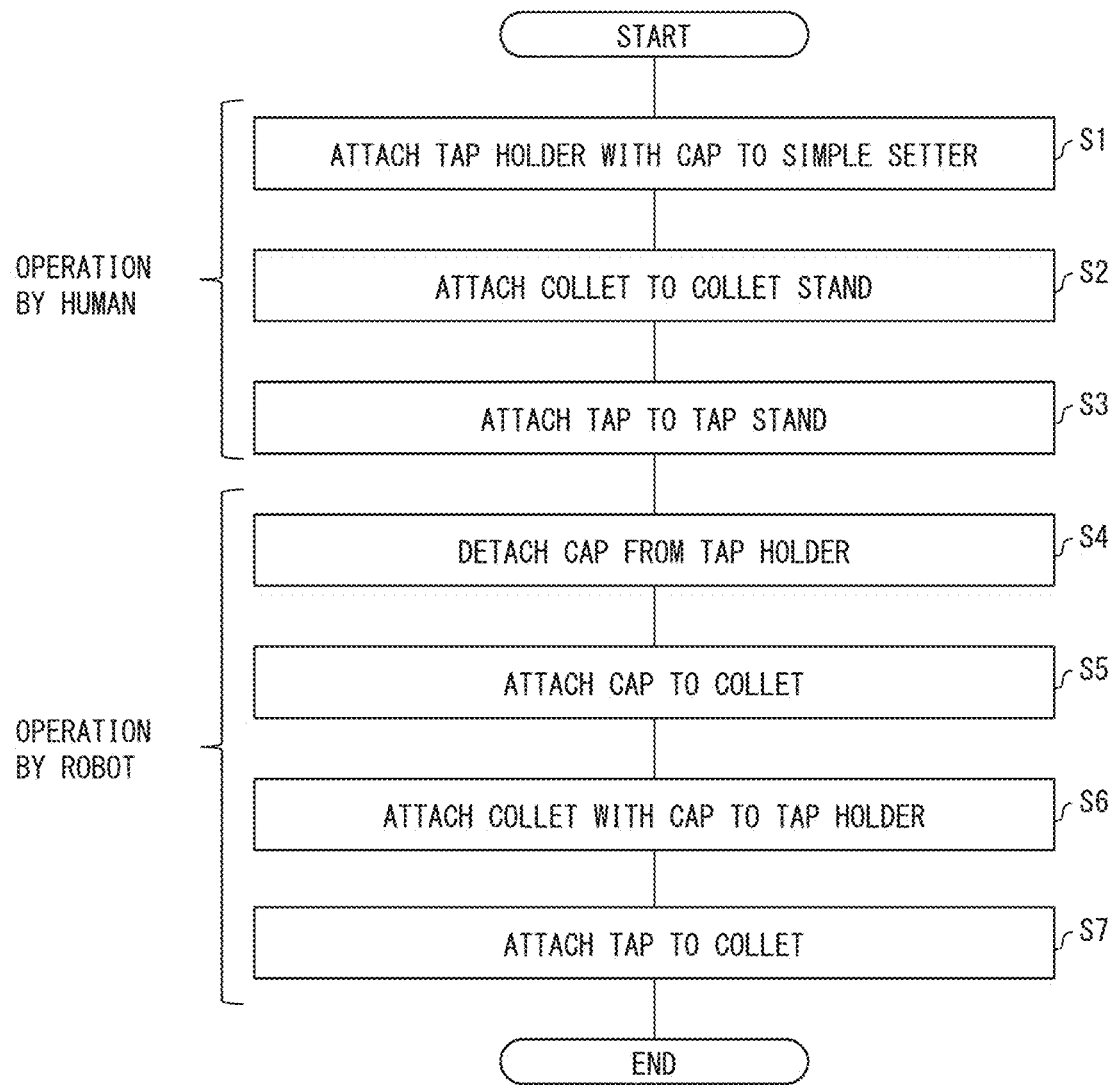
FIG. 4 is a flow chart showing the steps of manufacturing the assembly.

FIG. 4 is a flow chart showing the steps of manufacturing the assembly A0. Each of FIGS. 5 to 9 is a view illustrating the assembly A0 which is being manufactured. The following will describe the steps of manufacturing the assembly A0 with reference to FIGS. 4 to 9.

A. Preparatory Steps Performed by Operator

Steps S1 to S3, which are preparatory steps performed by an operator, are performed as preliminary stages for manufacturing steps performed by the robot 10. That is, the operator sets the assembly A4 (the tap holder 21 with the cap 23) on the simple setter Ba (step S1). That is, a tip of the tap holder 21 is inserted into the attachment hole Ha of the simple setter Ba, and then the cap 23 is placed on the protrusion T of the tap holder 21. In addition, the operator sets the tap 24 on the tap stand Bb (step S2). That is, the tap 24 is inserted into the attachment hole Hb of the tap stand Bb. Further, the operator sets the collet 22 on the collet stand Bc (step S3). That is, the collet 22 is inserted into the attachment hole Hc of the collet stand Bc. In this case, the steps S1 to S3 may be performed in any order. Alternatively, the steps S1 to S3 may be performed in parallel.

Here, there are no engagements or connections (i) between the attachment hole Ha and the tap holder 21, (ii) between the tap holder 21 and the cap 23, (iii) between the attachment hole Hb and the tap 24, and (iv) between the attachment hole Hc and the collet 22. This eliminates the operator having to make delicate adjustments when the operator inserts the tap holder 21 or the like into the attachment hole Ha or the like and places the tap holder 21 on the cap 23. That is, such operations require no skills and can be performed easily and quickly.

B. Manufacturing Steps Performed by Robot 10

Subsequently, the manufacturing steps are performed by the robot 10 (steps S4 to S7). The manufacturing steps can be divided into (1) to (3) below. Each of FIGS. 5 to 9 is a view illustrating the assembly A0 which is being manufactured.

(1) Production of Assembly A1

Figure 5:
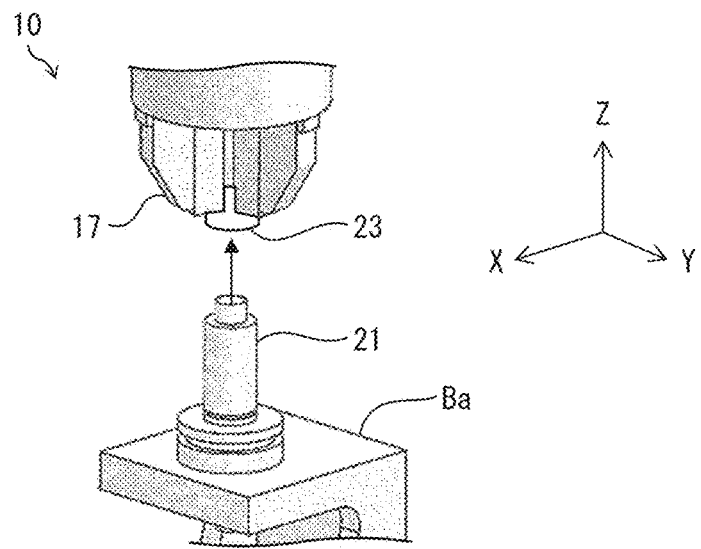
FIG. 5 is a view illustrating an assembly which is being manufactured.
Figure 6:
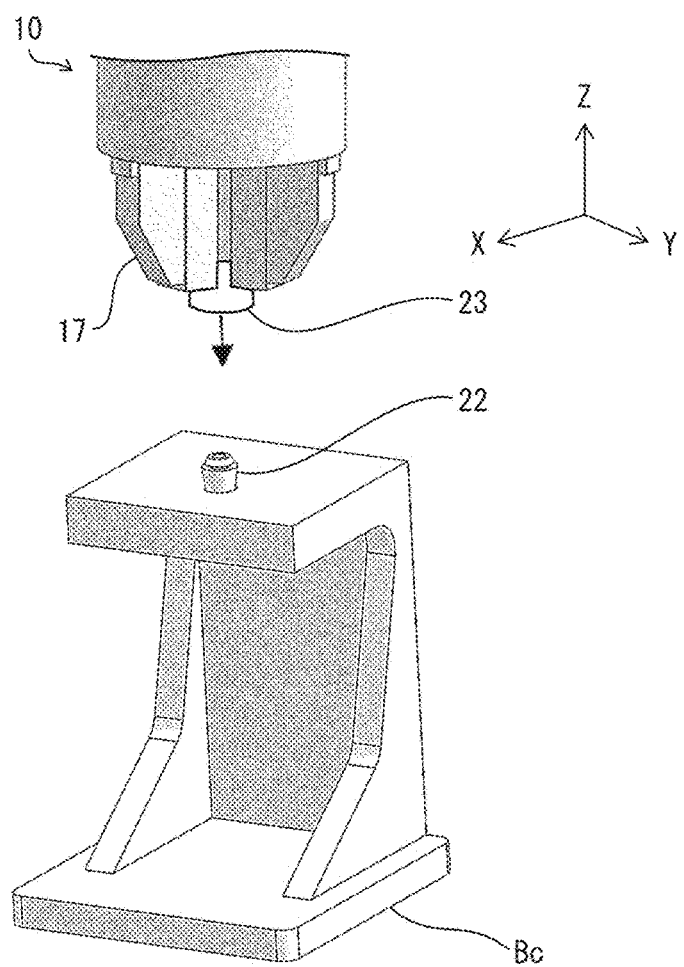
FIG. 6 is a view illustrating an assembly which is being manufactured.
Figure 7:
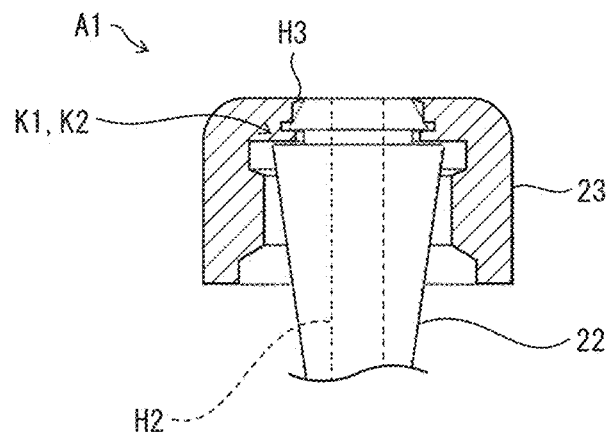
FIG. 7 is a view illustrating an assembly which is being manufactured.
Figure 8:
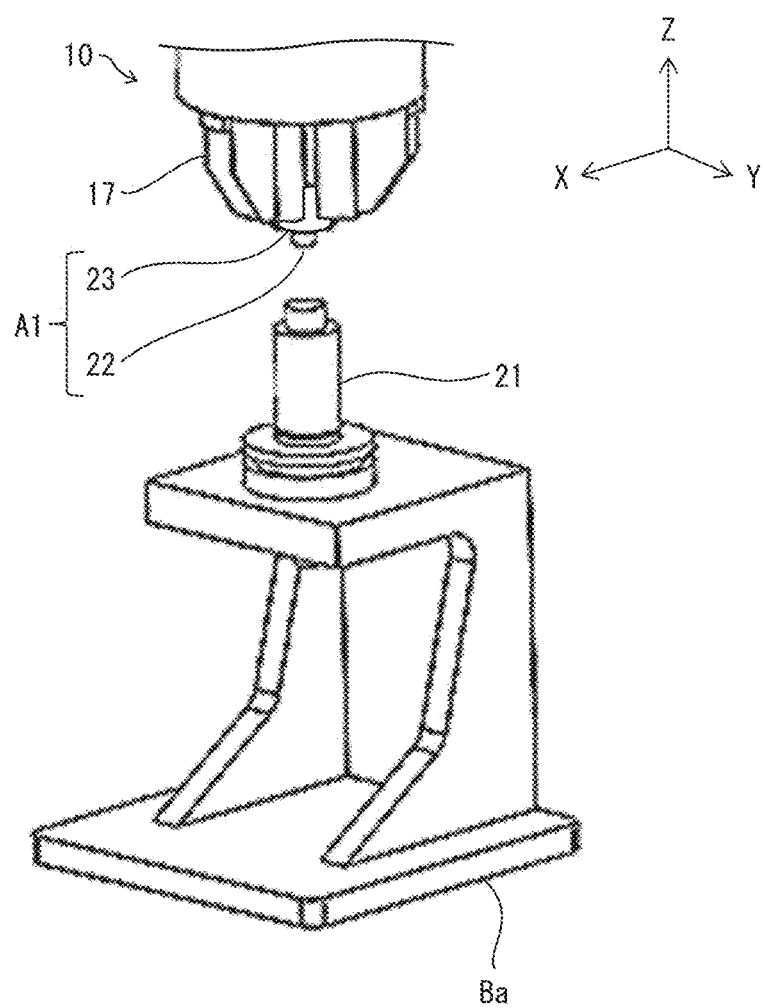
FIG. 8 is a view illustrating an assembly which is being manufactured.
Figure 9:
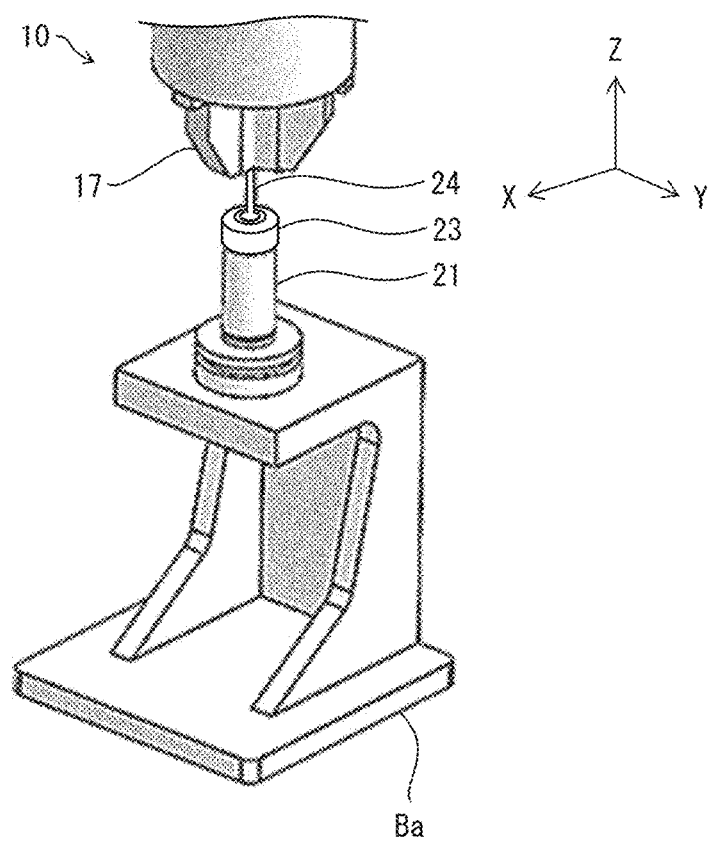
FIG. 9 is a view illustrating an assembly which is being manufactured.

The robot 10 grips and detaches, with use of the chuck 17, the cap 23 of the assembly A4 (the tap holder 21 on which the cap 23 is placed) held by the simple setter Ba (step S4, FIG. 5). The robot 10 produces the assembly A1 by, with use of the chuck 17, engaging the detached cap 23 with the collet 22 (having the recess H2) held by the collet stand Bc such that the cap 23 is placed on the collet 22 (step S5, FIGS. 6 and 7). In the assembly A1, the collet 22 and the cap 23 are engaged with each other through the engagement parts K1 and K2, and the recess H2 of the collet 22 can be seen from the opening H3 of the cap 23.

(2) Production of Assembly A2

The robot 10 grips, with use of the chuck 17, the assembly A1 held by the collet stand Bc. Subsequently, the robot 10 produces the assembly A2 by inserting, with use of the chuck 17, the assembly A1 into the recess H1 of the tap holder 21 held by the simple setter Ba (step S6, FIG. 8). The assembly A2 is such that the collet 22 which is engaged with the cap 23 is inserted into the recess H1 of the tap holder 21. This tap holder 21 is the one from which the cap 23 has been detached in the step S4. In the step S6, it is possible to use the tap holder 21 from which the cap 23 has been detached in the step S4. As described above, in the assembly A1, the collet 22 and the cap 23 are engaged with each other. Thus, gripping and lifting the cap 23 with use of the chuck 17 makes it possible to lift the collet 22 together with the cap 23 being lifted.

(3) Production of Assembly A0

The robot 10, with use of the chuck 17, grips and detaches the tap 24 held by the tap stand Bb. Subsequently, the robot 10, with use of the chuck 17, passes the tap 24 through the opening H3 of the cap 23 of the assembly A2 held by the simple setter Ba, and inserts the tap 24 into the recess H2 of the collet 22. In this way, the robot 10 produces the assembly A0, which is an assembly including a tap (step S7, FIGS. 9 and 3).

In the way as described above, the assembly A0 is manufactured. With use of the assembly A0, the tap 24 can be easily attached to a processing device.

Figure 10:
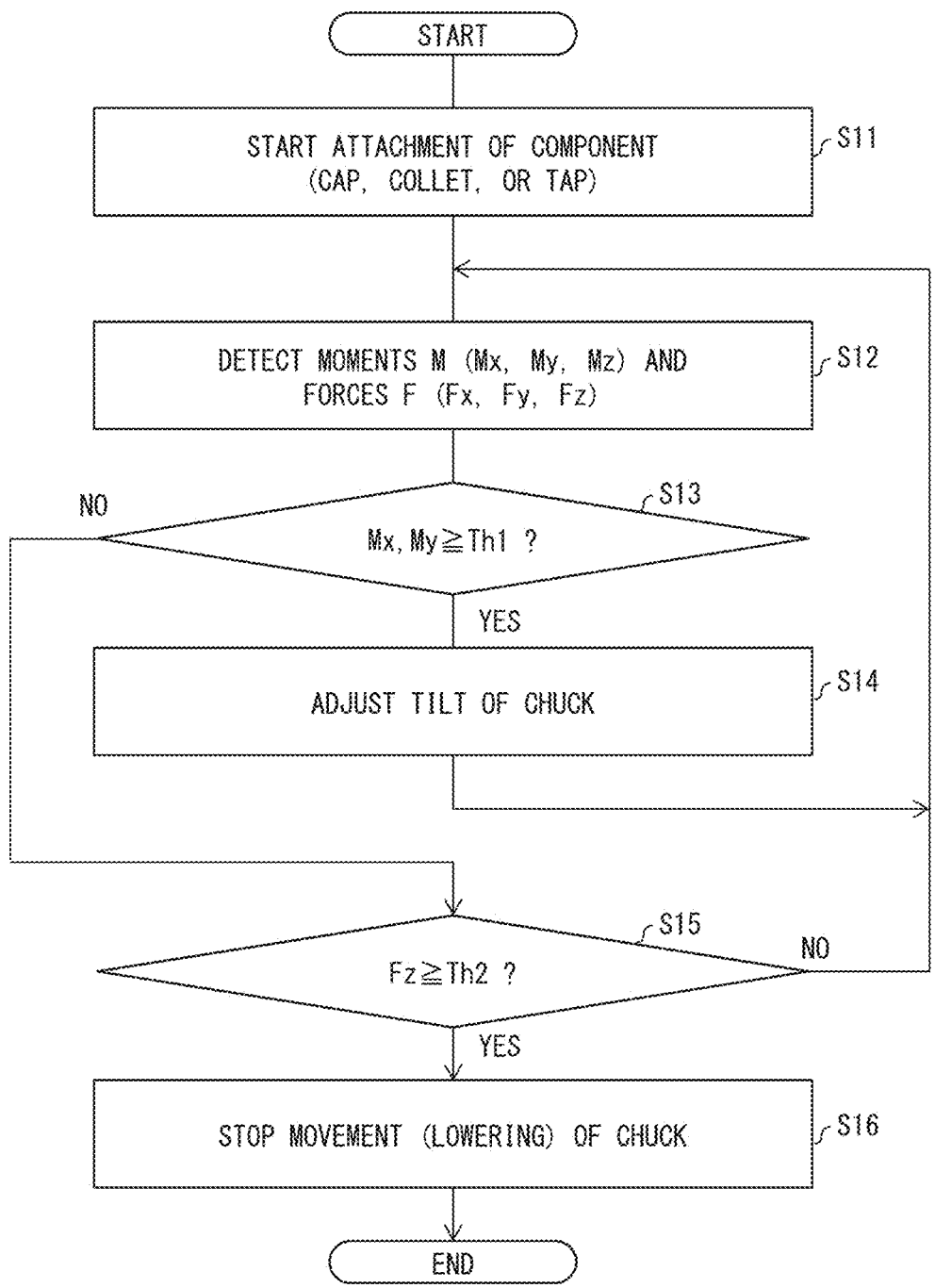
FIG. 10 is a flow chart showing procedure for producing the assembly on the basis of forces and moments detected by a force sensor.

Here, in the steps S5 to S7, the robot 10 performs steps of producing the assemblies A1, A2, and A0 on the basis of forces and moments detected by the force sensor 18. This improves reliability of manufacture of the assembly A0. FIG. 10 is a flow chart showing the procedure for producing the assemblies A1, A2, and A0 on the basis of the forces and moments detected by the force sensor 18.

In each of the steps (steps S5 to S7) of producing the assemblies A1, A2, and A0, the component (the cap 23, the assembly A1, or the tap 24) is attached to an object to which the component is to be attached (the collet 22, the tap holder 21, or the assembly A2) (step S11). At that time, the force sensor 18 detects moments M (Mx, My, and Mz) (step S12). The assemblies A1, A2, and A0 are produced basically such that forces F and the moments M detected by the force sensor 18 do not exceed the respective predetermined thresholds (Th1, Th2) (steps S13 to S16). This improves reliability of manufacture of the assembly A0.

Specifically, in a case where one of the moments M detected by the force sensor 18 is equal to or more than the predetermined threshold Th1, a tilt of the chuck 17 is adjusted (steps S13 and S14). The adjustment is made to align the axis of a component and the axis of the object to which the component is to be attached with each other. This makes it possible to, for example, prevent the tap 24 from damaging the collet 22.

Further, in a case where a force Fz detected by the force sensor 18 is equal to or more than the predetermined threshold Th2, the chuck is stopped from moving (lowering) in the direction of the force (steps S15 and S16). That is, it can be determined that the attachment of the component has been finished.

As described above, in the present embodiment, the attachment of the component to each of the simple setters Ba to Bc, which is a relatively easy operation, is performed manually. Subsequently, the attachment of the component to the object to which the component is to be attached is performed by the robot 10 including the force sensor 18. This makes it possible to manufacture the assembly A0 including the tap 24 efficiently and without errors.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Manufacturing system for manufacturing assembly including tap
10 Robot
12 to 15 Arm
17 Chuck
18 Force sensor
20 Control section
21 Tap holder
22 Collet
23 Cap
24 Tap
A0, A1, A2 Assembly.

The invention claimed is:

1. A manufacturing method for manufacturing an assembly including a tap with use of a robot, the robot comprising: a chuck; an arm, connected to the chuck, for moving the chuck; and a force sensor configured to detect a force applied to the chuck or a moment applied to the chuck, the manufacturing method comprising:
  a step of producing a first assembly by gripping a cap having an opening with use of the chuck and engaging the cap with a collet having a recess such that the cap is placed on the collet, the first assembly being such that the recess of the collet is disposed in the opening;
  a step of producing a second assembly by gripping the first assembly with use of the chuck and inserting the first assembly into a recess of a tap holder, the second assembly being such that the collet which is engaged with the cap is inserted into the recess of the tap holder; and
  a step of producing a third assembly, which is an assembly including a tap, by gripping the tap with use of the chuck and inserting the tap through the opening of the cap of the second assembly into the recess of the collet,
  the first assembly producing step, the second assembly producing step, and the third assembly producing step being performed based on the force or the moment which is detected by the force sensor.

2. The manufacturing method according to claim 1, wherein:
  the step of producing the first assembly comprises a step of gripping the cap with use of the chuck and detaching the cap from a fourth assembly, the fourth assembly being the tap holder on which the cap is placed; and the cap which has been detached is gripped with use of the chuck and is engaged with the collet such that the cap is placed on the collet.

3. The manufacturing method according to claim 2, wherein, in the step of producing the second assembly, the robot grips the first assembly with use of the chuck and inserts the first assembly into the recess of the tap holder from which the cap has been detached.

4. The manufacturing method according to claim 1, wherein the first assembly producing step, the second assembly producing step, and the third assembly producing step are performed such that the force or the moment which is detected by the force sensor exceeds neither a first threshold for preventing the tap from damaging the collet nor a second threshold corresponding to finish of attachment of a component.

5. The manufacturing method according to claim 4, wherein, in a case where the moment detected by the force sensor is equal to or more than the first threshold, a tilt of the chuck is adjusted.

6. The manufacturing method according to claim 4, wherein, in a case where the force detected by the force sensor is equal to or more than the second threshold, the chuck is stopped from moving in a direction of the force.

\* \* \* \* \*